Oct. 25, 1938.                R. LEE                2,134,522
                        POWER SUPPLY CIRCUITS
                         Filed May 21, 1936

WITNESSES:                                INVENTOR
Leon J. Faga.                           Reuben Lee.
Edward Broder                           BY F. W. Lyle.
                                              ATTORNEY Patented Oct. 25, 1938

2,134,522

UNITED STATES PATENT OFFICE 2,134,522

POWER SUPPLY CIRCUITS

Reuben Lee, Springfield, Mass., assignor to Westinghouse Electric & Manufacturing Company, East Pittsburgh, Pa., a corporation of Pennsylvania Application May 21, 1936, Serial No. 81,012

6 Claims. (Cl. 178—44)

My invention relates to filter circuits, more particularly to the type used in conjunction with rectifiers in obtaining a direct current supply of power for radio apparatus.

It is well known that certain types of power supply apparatus involving rectifiers in combination with filters for obtaining a direct current output inherently possess poor voltage regulation characteristics. The type of filter customarily used comprises one or more sections, each section embodying an inductance in series with the load and a condenser connected across the load.

The poor regulation is inherently due to the fact that the condenser in the first section closest to the rectifier charges up to a voltage greater than the average of the rectified wave when the load on the filter is light. The charging of this condenser to such an excessive voltage may be attributed to the fact that the time constant of the circuit prevents the discharge of the condenser between successive rectified voltage peaks through the load resistance. This component of regulation is entirely independent of the IR drop in the circuit elements and may exceed it greatly.

It is accordingly an object of my invention to improve the voltage regulation characteristics of filters used in combination with a source of rectified or undulatory energy.

A further object of my invention is to provide an improved filter which embodies means for reducing transients normally occurring when the rectifier is first started into operation.

Figure 2:
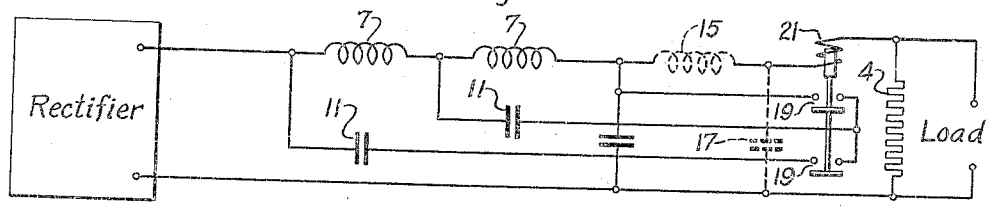
Figure 3:
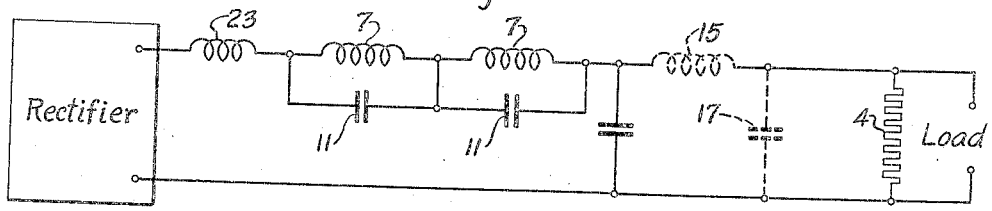
Figure 4:
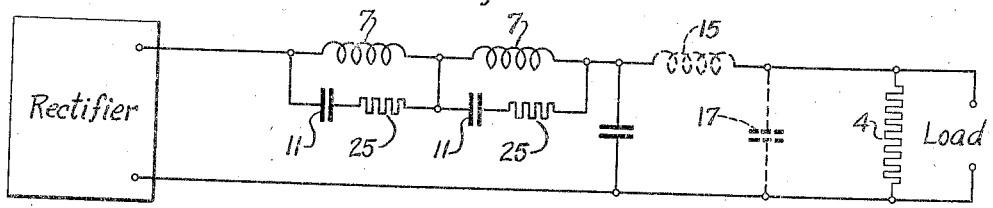

Additional objects of my invention will be pointed out in the following description of the same, taken in conjunction with the accompanying drawing, wherein Figure 1 embodies a curve depicting the improved use obtained through the operation of my improved filter; and Figs. 2, 3 and 4 relate to a filter designed in accordance with my invention and embodying various means for reducing initial starting transients.

Figure 1:
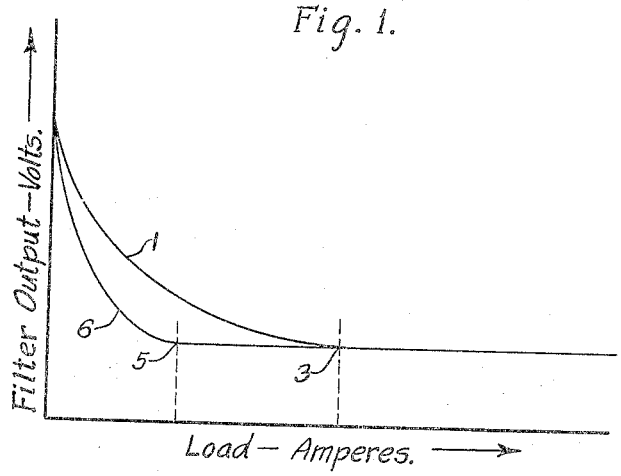

The graph of Fig. 1 depicts the manner in which the voltage at the load terminals of the filter varies with the change in load. Under no-load conditions, the direct-current voltage at the terminals is substantially equal to the peak rectified value and may drop in accordance with the curve 1 upon an increase in load until the load current reaches a value indicated at the point 3, at which values the voltage equals the average voltage and remains substantially the same for further increases in the load.

This curve shows that the voltage changes over a rather wide range of values as the load is reduced from that represented by the point 3 to a no-load condition, and since the load at the point 3 may be of a substantial value and representing an intermediate value of load occurring in the practical operation of the apparatus, it is apparent that the apparatus will present poor voltage regulation.

This regulation can be improved somewhat by placing a bleeder resistor 4 across the output for maintaining a normally light load across the terminals of the filter so as to make the voltage at point 3 of the curve the no-load voltage of the rectifier. In some cases, this is not feasible unless an excessive value of choke inductance can be designed into the first choke of the filter. This increase in inductance will produce a new characteristic curve such as the curve 6 with a corresponding shifting of the point 3 to a position of lower load current value as indicated by the reference numeral 5. To obtain the above results, however, the inductance of the first filter section would approximately have to be doubled in value from what would be used for the no-load value equal to that indicated at the point 3. This inductance might be excessively high in value and impractical.

Another remedy which might be considered in some cases would be the employment of a "swinging choke" in place of the first filter choke. A "swinging choke" is one so designed that its inductance is of a normal value, during and above a certain minimum load value, and which, upon the lightening of the load, will rapidly increase its inductance to a high value. This condition is obtained by so designing the inductance that the core becomes practically saturated at and above the predetermined minimum load current, its inductance with a staurated core being considered its normal operating value. This expedient, however, cannot be employed under all conditions.

I have found that by replacing the choke usually found in the first filter section, with a pair of chokes 7 serially connected and then tuning each of these chokes with a condenser 11, to substantially the frequency of the rectified energy, a very marked improvement in the voltage regulation of the circuit will result. Using a single phase full wave rectifier rated at 1300 volts and a full load of 1.00 amperes, with the customary type of filter, a bleeder of a value sufficient to draw a minimum load of 350 milliamperes was required and this produced a voltage regulation of 52%. After incorporating a pair of chokes in the filter in accordance with my teachings and tuning them to the frequency of the rectified voltage, the bleeder load was reduced from 350 milli-amperes to a mere 30 milli-amperes and the regulation was improved from the 52% mentioned to 10.5%. I attribute this desirable result to the fact that these tuned series inductances have their apparent inductance increased to an effectively high value. The actual inductance of the series connected coils is comparatively low and within practical and commercial limits.

When embodied in a filter in the manner described it will enable the elimination of one or more of the subsequent filter sections, such as constituted by choke 15 and condenser 17, shown in dotted lines, yet the average percentage ripple in the output of the filter will be decreased by reason of the tuned chokes. These subsequent filter stages will be necessary only, when an exceedingly low ripple content is demanded of the filter. Of course, if the design requires, additional tuned chokes may be inserted in series with those already mentioned, and additional filter sections of the customarily used type as illustrated in dotted lines might also be added if the results require.

To reduce the intensity of transients which possibly may be initiated upon setting the rectifiers in operation and exciting the filter, the tuning condenser of at least one of the tuned chokes is maintained out of circuit until the period during which the transient would normally exist, has terminated. A pair of normally open contacts 19 in series with the condenser in question, these contacts being associated with a relay winding 21 in series with the load, could be depending upon to hold the condenser 11 out of the circuit until the transient period has expired. In the operation of this set up, the insertion of the condenser in the circuit by the closing of these relay contacts will occur after the load current has built up to a certain predetermined value, for which value the relay may be designed to operate.

A somewhat simpler arrangement for the same purpose relies upon the presence of a choke coil 23 connected in series with the tuned chokes.

A further modification for reducing the effect of transients, permits the transients to become started but damps them considerably before they have an opportunity to build up and reach excessive values. In this modification, a damping resistor 25 is placed in series with one or more of the tuning condensers 11 in the filter.

While the effective operation of my invention, insofar as the desirable voltage regulation characteristic and ripple elimination results are desired, depends in large measure upon the presence of more than one of the tuned chokes in series with each other, the various schemes for reducing and preventing initial starting transients with a filter of the type described by me, will operate effectively in preventing transients, even should only one tuned choke be present in the filter, and I do not desire that my invention be limited to the presence of a plurality of series connected tuned chokes insofar as the means for reducing transients is concerned.

While I have disclosed my invention in detail, I desire that my invention be not limited except as defined in the appended claims.

I claim as my invention:

1. An electrical filter system comprising a source of undulatory energy, a load connected to said source by a pair of unbroken line conductors to derive energy therefrom, said line embodying a choke coil in series with said load, capacitor means shunting said choke coil, said capacitor means and the coil it shunts being tuned to the frequency of said undulatory energy and a resistance in series with said capacitor means.

2. An electrical filter system comprising a source of undulatory energy, a load connected to said source to derive energy therefrom, a plurality of connected choke coils in series with said load, a condenser connected across each of said coils, said condensers being of a value sufficient to tune said coils to the fundamental frequency of said undulatory energy, normally opened relay contacts in series with at least one of said condensers and means for actuating said contacts into closed position shortly after excitation of said filter takes place.

3. An electrical filter system comprising a source of undulatory energy, a load connected to said source to derive energy therefrom, a plurality of connected choke coils in series with said load, a condenser connected across each of said coils, said condensers being of a value sufficient to tune said coils to the fundamental frequency of said undulatory energy, normally opened relay contacts in series with at least one of said condensers and means for actuating said contacts into closed position shortly after excitation of said filter takes place, said means comprising an electromagnetic relay serially connected between said source and said load.

4. In an electrical filter system interposed between a rectifier and a load circuit therefor, an inductive element serially connected and a capacitive element connected in parallel with respect to said rectifier and said load, and means for varying the effective impedance of said inductive element upon variation of load in said load circuit.

5. In an electrical filter system interposed between a source of rectified alternating currrent and a variable load circuit, including fixed inductances serially connected and fixed capacities connected in parallel with respect to said source and said load, and means for increasing the effective impedance of said inductances automatically upon increase of load in said load circuit.

6. In an electrical filter system, a source of rectified alternating current for supplying energy to a load circuit, a closed series circuit connected in parallel with said source, including a fixed load and a plurality of inductances, condensers between said inductances connected in parallel with said source, capacitive elements adapted to be connected individually in parallel with said inductances and switching means operable automatically upon current flow in said load circuit exceeding a predetermined magnitude for effectively connecting said capacitive elements.

REUBEN LEE.